United States Patent
Keller

(10) Patent No.: US 9,045,035 B2
(45) Date of Patent: Jun. 2, 2015

(54) SINGLE SPEED TRANSMISSION FOR PLUGIN HYBRID ELECTRIC VEHICLE WITH TWO DISCONNECTS

(75) Inventor: Robert F. Keller, Chesterfield, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 56 days.

(21) Appl. No.: 13/580,802

(22) PCT Filed: Feb. 23, 2011

(86) PCT No.: PCT/US2011/025825
§ 371 (c)(1),
(2), (4) Date: Sep. 10, 2012

(87) PCT Pub. No.: WO2011/109196
PCT Pub. Date: Sep. 9, 2011

(65) Prior Publication Data
US 2013/0035185 A1    Feb. 7, 2013

Related U.S. Application Data

(60) Provisional application No. 61/309,022, filed on Mar. 1, 2010.

(51) Int. Cl.
*F16H 7/06*     (2006.01)
*B60K 6/48*     (2007.10)
*B60K 6/38*     (2007.10)
(Continued)

(52) U.S. Cl.
CPC ... *B60K 6/48* (2013.01); *B60K 6/38* (2013.01); *B60W 10/02* (2013.01); *B60W 10/06* (2013.01); *B60W 10/08* (2013.01); *B60W 20/00* (2013.01); *F16H 37/065* (2013.01);
(Continued)

(58) Field of Classification Search
USPC .................... 474/148; 180/65.22; 903/902
See application file for complete search history.

(56) References Cited

U.S. PATENT DOCUMENTS 4,381,828 A    5/1983    Lunn et al.
4,400,997 A *   8/1983    Fiala ............................. 74/661
(Continued)

FOREIGN PATENT DOCUMENTS

AU           234376       9/1960
DE        4212861 B     8/2005
JP       2005-147312      6/2005

*Primary Examiner* — William A Rivera
*Assistant Examiner* — Michael Riegelman
(74) *Attorney, Agent, or Firm* — Helmholdt Law PLC; Thomas D. Helmholdt

(57) ABSTRACT

A power transfer system (10) for a vehicle to be driven by a prime mover through a first input drive shaft (12) and an electric motor through a second input drive shaft (14) carried by the vehicle. A power transfer system (10) supports the first and second input drive shafts (12, 14) to be mechanically interconnected to an output drive shaft (16) for driving driven wheels of the vehicle. A clutch (18) engages (18*a*) and disengages (18*b*) the first input drive shaft (12) with respect to the output drive shaft (16). A first output drive sprocket (24) is connected to the output drive shaft (16), a second output drive sprocket (22) is connected to the second input drive shaft (14), and an endless loop sprocket-engaging drive member (26) extends between the first and second sprockets (24, 22). A disconnect mechanism (20) engages (20*b*) and disengages (20*a*) the second input drive shaft (14) with respect to the output drive shaft (16). The disconnect mechanism (20) is located between one of the sprockets (24, 22) and its corresponding drive shaft (16, 14).

11 Claims, 3 Drawing Sheets

(51) Int. Cl.
 B60W 10/02 (2006.01)
 B60W 10/06 (2006.01)
 B60W 10/08 (2006.01)
 B60W 20/00 (2006.01)
 F16H 37/06 (2006.01)

(52) U.S. Cl.
 CPC ......... *Y02T 10/6221* (2013.01); *Y02T 10/6269* (2013.01); *Y02T 10/6286* (2013.01); *Y02T 90/14* (2013.01)

(56) References Cited

U.S. PATENT DOCUMENTS

| | | | |
|---|---|---|---|
| 4,646,896 A | 3/1987 | Hammond et al. | |
| 5,584,776 A | 12/1996 | Weilant et al. | |
| 6,041,877 A * | 3/2000 | Yamada et al. | 180/65.25 |
| 6,186,029 B1 | 2/2001 | McQuinn | |
| 6,302,227 B1 * | 10/2001 | Takemura et al. | 180/65.25 |
| 6,464,608 B2 | 10/2002 | Bowen et al. | |
| 6,533,692 B1 | 3/2003 | Bowen | |
| 6,533,693 B2 * | 3/2003 | Bowen et al. | 475/5 |
| 6,719,656 B2 | 4/2004 | Bowen | |
| 6,881,168 B2 | 4/2005 | Bowen | |
| 7,231,848 B2 | 6/2007 | Breen et al. | |
| 7,246,672 B2 * | 7/2007 | Shirai et al. | 180/65.25 |
| 7,276,008 B2 * | 10/2007 | Yasui et al. | 475/5 |
| 7,497,286 B2 | 3/2009 | Keller et al. | |
| 7,506,710 B2 | 3/2009 | Abe et al. | |
| 7,533,754 B2 | 5/2009 | Burrows et al. | |
| 7,610,891 B2 * | 11/2009 | Seufert et al. | 123/179.25 |
| 2002/0189397 A1 | 12/2002 | Sakamoto et al. | |
| 2004/0055800 A1 | 3/2004 | Katou et al. | |
| 2004/0097309 A1 * | 5/2004 | Kirstein | 474/101 |
| 2007/0023211 A1 | 2/2007 | Keller et al. | |
| 2007/0163823 A1 | 7/2007 | Abe et al. | |
| 2008/0108476 A1 * | 5/2008 | Pagot et al. | 477/5 |
| 2008/0156555 A1 | 7/2008 | Kluge et al. | |
| 2010/0009798 A1 | 1/2010 | Keller et al. | |
| 2011/0120794 A1 * | 5/2011 | Hobel | 180/206.4 |
| 2013/0035204 A1 * | 2/2013 | Noboru et al. | 477/39 |

* cited by examiner

SINGLE SPEED TRANSMISSION FOR PLUGIN HYBRID ELECTRIC VEHICLE WITH TWO DISCONNECTS

FIELD OF THE INVENTION

The invention relates to the propulsion of a land vehicle by a motor carried on the vehicle, wherein an electric motor supported by a body-frame drives the vehicle combined with a prime mover, other than another electric motor, for driving the vehicle, wherein the electric motor and prime mover are mechanically interconnected with the drive wheels for driving the vehicle with a power transfer system including a relatively rotatable bodies provided with teeth and inter-engaging elements, such as sprockets and chains, or belts and pulleys, whereby one rotatable body will impart to or receive motion or power from the other rotatable body by rolling contact with the inter-engaging elements, wherein the power transfer system gearing connects the prime motor and the electric motor either individually or unitarily to the same load, wherein the power transfer system includes a power input sprocket or pulley in driving engagement with a chain or belt for advancing the chain or belt along an endless path of travel, and wherein a power output sprocket or pulley is engaged with the chain or belt at a position along such endless path to be driven by the chain or belt and supply power for driving the load, wherein each sprocket or pulley structure includes a chain-engaging or belt-engaging drive face formed by circumferentially spaced, radially extending teeth or ridges intended for driving engagement with radially extending surfaces correspondingly spaced along the length of a chain or belt, wherein a clutch operation is regulated and such regulation is interrelated with that of the prime motor and electric motor.

BACKGROUND

It is generally known to provide a transfer case-like device that will allow conversion of a two-wheel drive (2WD) vehicle equipped with a gasoline engine into what is known as a "Plug-in Hybrid Electric Vehicle", or PHEV vehicle. This power transfer system includes two power inputs, one power output, and one clutch mechanism moveable between an engaged position and a disengaged position. One power input interfaces with the transmission (e.g. receives power from engine). The other power input interfaces with an electric motor. The power output interfaces with a drive shaft and provides torque to the wheels. A chain and two sprockets deliver power from the electric motor to the power output shaft. This power transfer system allows the rear power output shaft (i.e., the wheels) to be coupled and decoupled from the engine/transmission through a clutch mechanism. It allows the rear power output shaft (i.e. the wheels) to be driven via the electric motor. It also allows the wheels to be driven by both the gas engine and the electric motor. The clutch can couple and decouple the engine/transmission from the output shaft. However, the output shaft is always connected to the electric motor through the power transfer system, thus causing the design to operate less efficiently when operating in gas mode, in other words, the electric motor is always driven by the output shaft through the chain and sprockets and finally through the electric motor power input shaft.

SUMMARY

To maximize efficiency, it would be desirable to provide some type of disconnect mechanism to the power transfer system allowing higher efficiency operation when operating in gas mode. Accordingly, a power transfer system can support a first input drive shaft and second input drive shaft to be mechanically interconnected to an output drive shaft for driving driven wheels of the vehicle. The power transfer system can include a clutch for engaging and disengaging the first input drive shaft with respect to the output drive shaft. A first output drive sprocket can be connected to the output drive shaft. A second output drive sprocket can be connected to the second input drive shaft. An endless loop sprocket-engaging drive member can extend between the first and second sprockets. A disconnect mechanism can engage and disengage the second input drive shaft with respect to the output drive shaft. The disconnect mechanism can be located between one of the first output drive sprocket and the corresponding output drive shaft, and the second output drive sprocket and the corresponding second input drive shaft.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

As used herein an engine or prime mover is defined as a primary source of rotational energy. As used herein an input shaft is defined as a mechanism that receives rotational motion from an engine and transfers such motion to a gear transmission or to a clutch. As used herein a gear transmission is defined as a mechanism including at least one gearing power path. The mechanism being capable of changing a speed ratio or rotational direction between a mechanical output of an engine and a load. As used herein a speed ratio is defined as a rotational velocity of an output shaft divided by the rotational velocity of an input shaft. As used herein a load is defined as a mechanism that receives rotational motion from a gear transmission or clutch to do useful work. As used herein a clutch is defined as a mechanism operable to couple two relatively rotatable parts together for common rotation or to uncouple such parts. The clutch as used in the definition is a clutch that may be used without a gear transmission or in advance of or behind a gear transmission in a power train. As used herein a gearing power path or power transfer system is defined as a mechanism including relatively rotatable bodies having engaging surfaces or which are drivingly connected by a belt or chain whereby a rotatable body will impart to or receive rotary motion or power from another rotary body by rolling contact. As used herein an output shaft is defined as a mechanism that receives rotational motion from a gear transmission or clutch and transfers such motion to a load. As used herein a chain or belt is defined as a power transferring member forming an endless loop and constructed of flexible material, or of articulated rigid links, to permit the member to conform to a radius of curvature of a sprocket or pulley drive face and intended, in use, to be driven in an endless path; and, by contact with the sprocket or pulley drive face, to transmit power to or extract power from the sprocket or pulley. As used herein a sprocket or pulley is defined as a device rotatable about an axis and having a drive face radially spaced from the axis of rotation for intended power transferring engagement with a chain or belt to drive the chain or belt on its endless path or to extract power from the chain or belt to drive an output load device.

Figure 1:
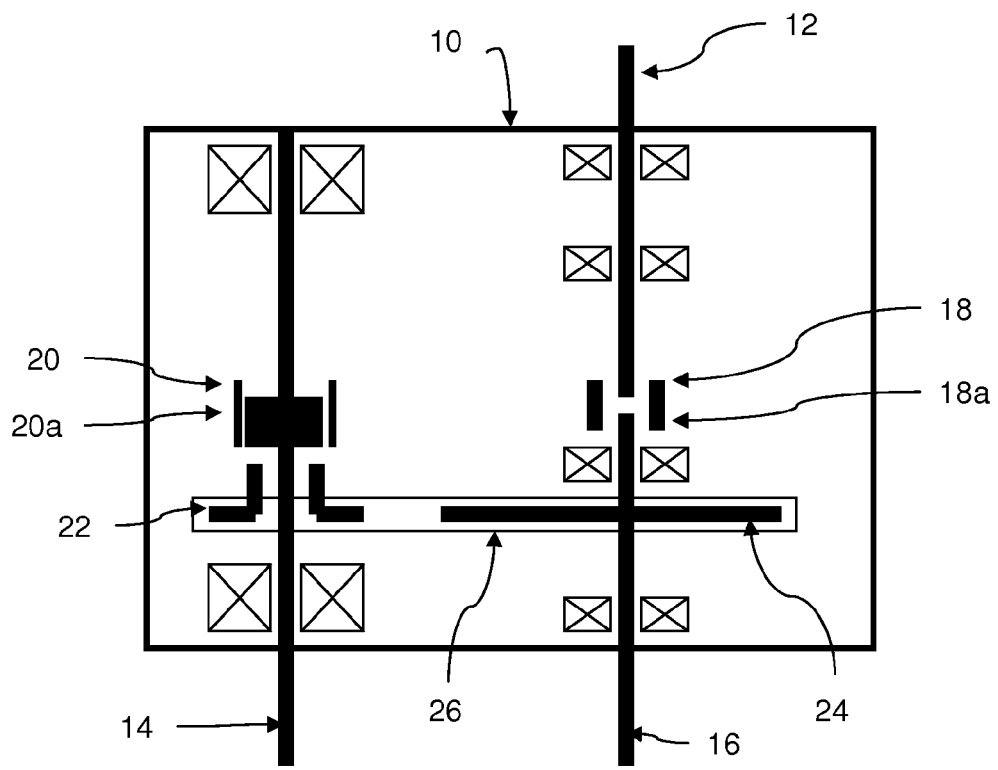
FIG. 1 is a schematic diagram of a power transfer system having a first power input, a second power input, a single power output, a clutch located between the first power input and the single power output, a chain and sprocket connection between the second power input and the single power output, and a disconnect mechanism between the second power input and the sprocket, where the power transfer system is shown in a first mode of operation with the clutch engaged and the disconnect mechanism disengaged allowing transfer of power solely from the first power input.
Figure 2:
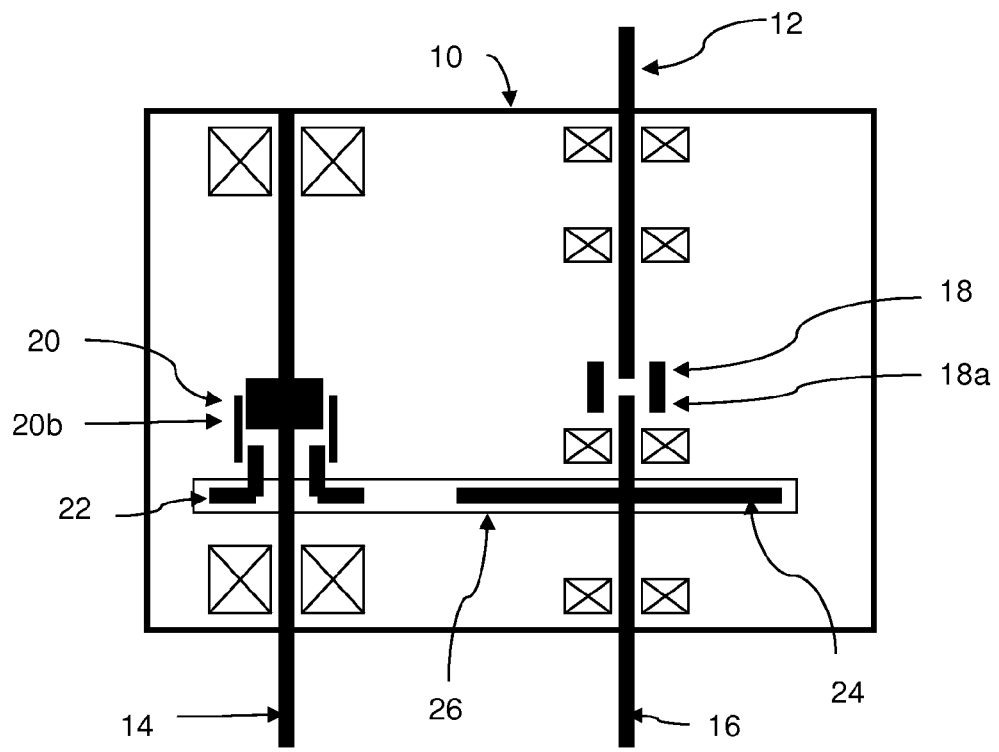
FIG. 2 is a schematic diagram of the power transfer system of FIG. 1, where the power transfer system is shown in a second mode of operation with the clutch engaged and the disconnect mechanism engaged allowing simultaneous transfer of power from both the first power input and the second power input.
Figure 3:
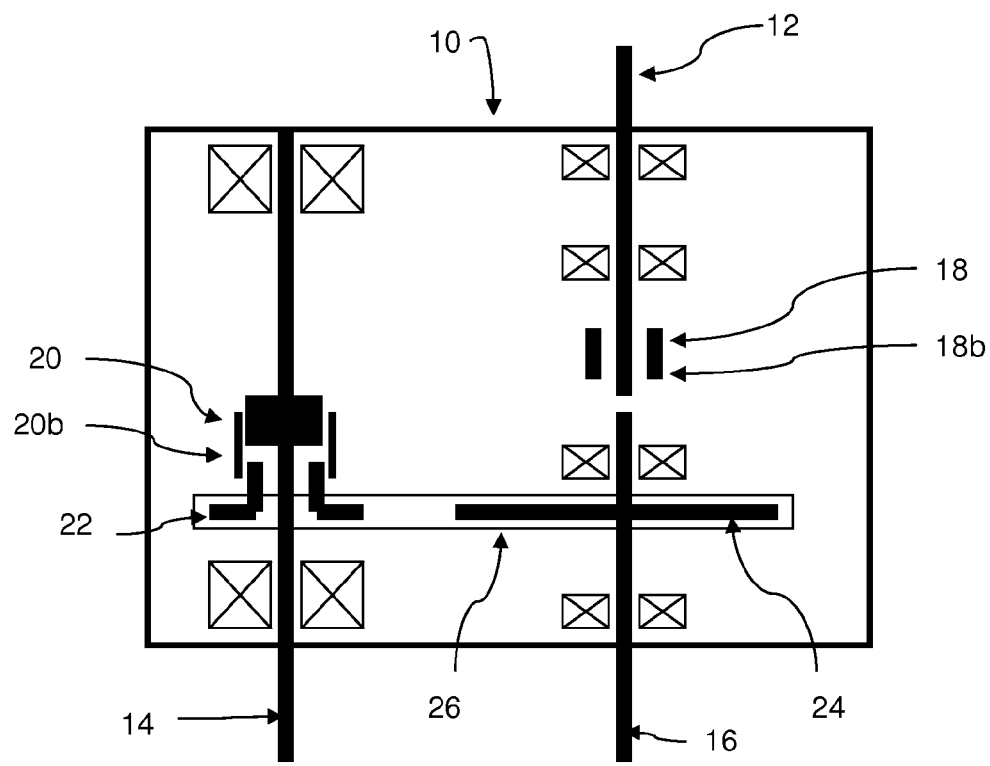
FIG. 3 is a schematic diagram of the power transfer system of FIGS. 1 and 2, where the power transfer system is shown in a third mode of operation with the clutch disengaged and the disconnect mechanism engaged allowing transfer of power solely from the second power input.

Referring now to FIGS. 1-3, a gearing power path or a power transfer system 10 for a land vehicle is schematically illustrated being powered by an electric motor and an engine or prime mover carried on the vehicle. The prime mover, or internal combustion engine, drives the vehicle through a first input drive shaft 12 combined with the electric motor for driving the vehicle through a second input drive shaft 14. The electric motor and prime mover are mechanically interconnected through the gearing power path with the drive wheels for driving the vehicle. The gearing power path or power transfer system 10 includes relatively rotatable sprocket bodies 22, 24 provided with teeth and an endless flexible loop power transferring member 26, whereby a rotatable sprocket body 24 will transfer power from another sprocket body 22 by contact with the endless flexible loop power transferring member 26. The transfer system 10 connects the prime motor and electric motor either individually (FIG. 1—prime mover alone; FIG. 3—electric motor alone) or unitarily (FIG. 2—both prime mover and electric motor) to the same load. The power transfer system 10 includes a rotatable power input sprocket body 22 in driving engagement with the endless flexible loop power transferring member 26 for advancing the endless flexible loop power transferring member along an endless path of travel. A rotatable power output sprocket body 24 engages with the endless flexible loop power transferring member 26 at a position along such endless path to be driven by the endless flexible loop power transferring member 26, by way of example and not limitation such as teeth-engaging elements, and supply power for driving a load. Each sprocket body 22, 24 structure includes a drive face formed by circumferentially spaced, radially extending teeth intended for driving engagement with radially extending surfaces correspondingly spaced along the length of the endless flexible loop power transferring member 26. The power transfer system 10 includes a clutch 18 for engaging (FIGS. 1-2; position 18a) and disengaging (FIG. 3; position 18b) the first input drive shaft 12 with respect to the output drive shaft 16. The clutch 18 can be used without a gear transmission, or in advance of or behind a gear transmission in a power train. A disconnect mechanism 20 is provided in the power transfer system 10 for engaging (FIG. 2-3; position 20b) and disengaging (FIG. 1; position 20a) the second input drive shaft 14 with respect to the output drive shaft 16. The disconnect mechanism 20 is located between the second sprocket 22 and the corresponding second input drive shaft 14 as illustrated in FIGS. 1-3.

Figure 4:
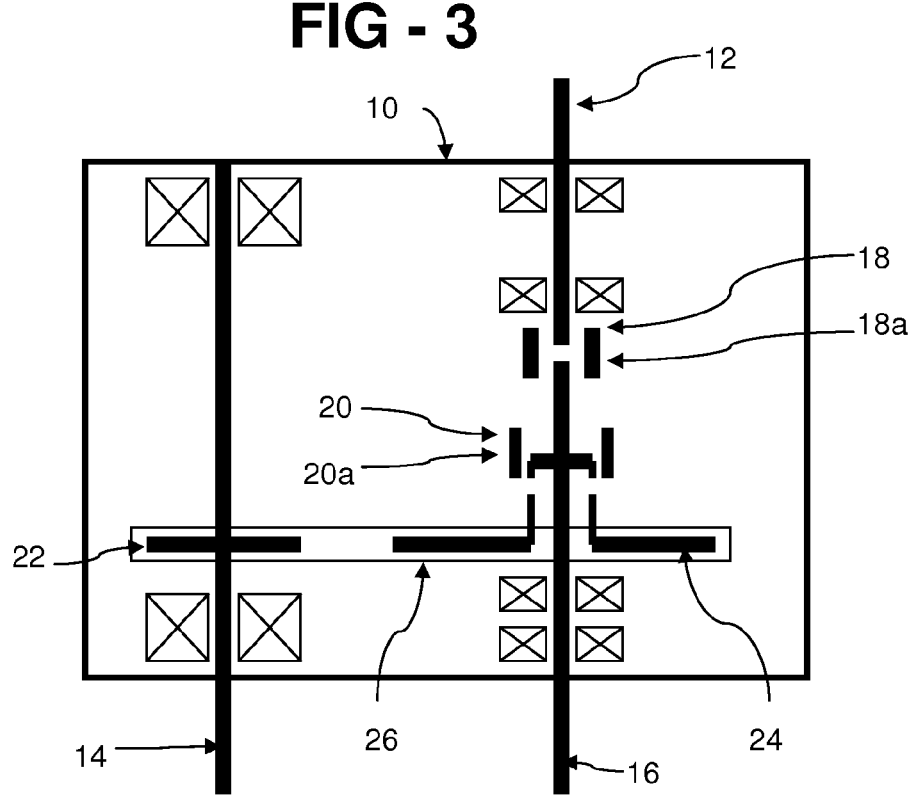
FIG. 4 is an alternative schematic diagram of a power transfer system having a first power input, a second power input, a single power output, a clutch located between the first power input and the single power output, a chain and sprocket connection between the second power input and the single power output, and a disconnect mechanism between the second power input and the sprocket, where the power transfer system is shown in a first mode of operation with the clutch engaged and the disconnect mechanism disengaged allowing transfer of power solely from the first power input.
Figure 5:
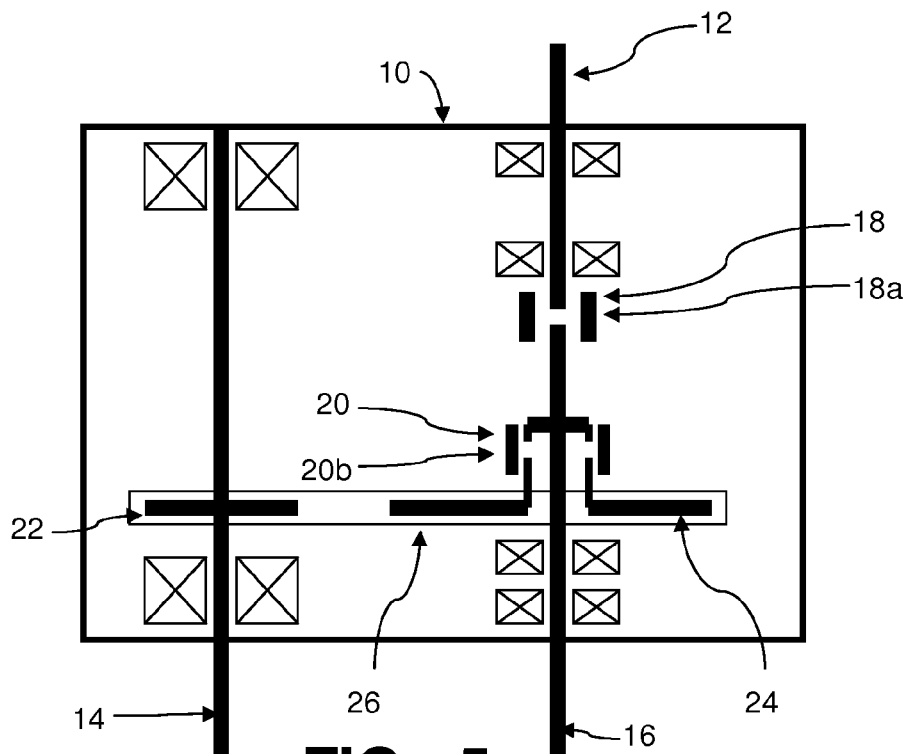
FIG. 5 is a schematic diagram of the power transfer system of FIG. 4, where the power transfer system is shown in a second mode of operation with the clutch engaged and the disconnect mechanism engaged allowing simultaneous transfer of power from both the first power input and the second power input.
Figure 6:
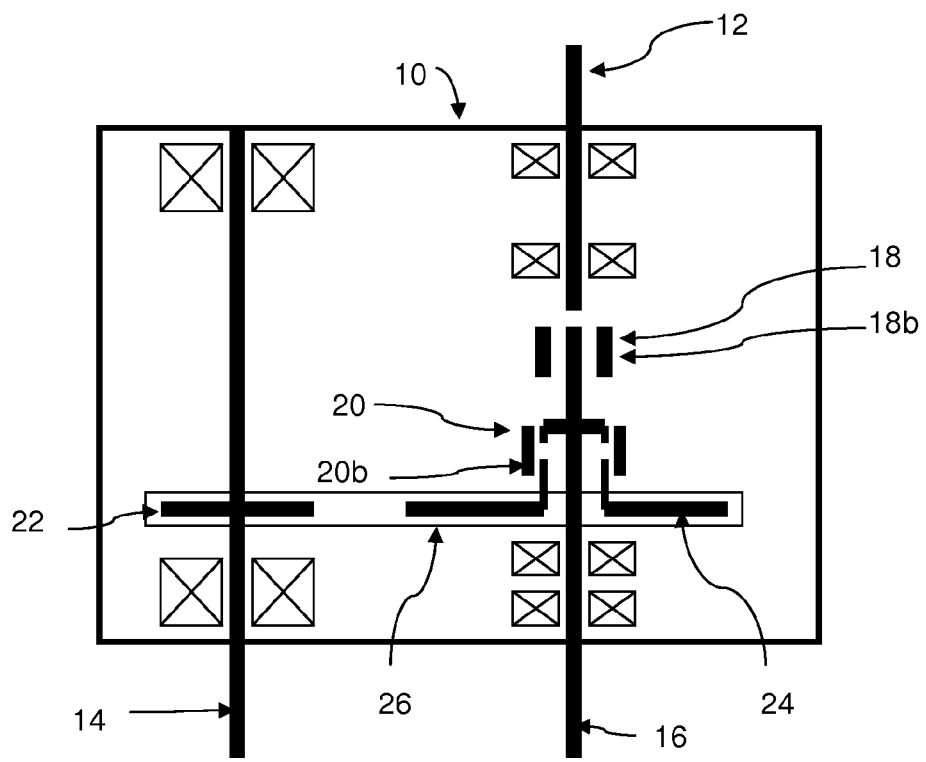
FIG. 6 is a schematic diagram of the power transfer system of FIGS. 4 and 5, where the power transfer system is shown in a third mode of operation with the clutch disengaged and the disconnect mechanism engaged allowing transfer of power solely from the second power input.

The power transfer system 10 can include the disconnect mechanism 20 located between the second output drive sprocket 22 and the second input drive shaft 14 as shown in FIGS. 1-3. Alternatively, the disconnect mechanism 20 can be located between the first output drive sprocket 24 and the output drive shaft 16 as shown in FIGS. 4-6. The disconnect mechanism 20 can be located along the output drive shaft 16 between the clutch 18 and the first output sprocket 24 as shown in FIGS. 4-6. The first and second input drive shafts 12, 14 can extend parallel to and offset with respect to one another. The first input drive shaft 12 can extend coaxially with respect to the output drive shaft 16. The second input drive shaft 14 can extend parallel to and offset with respect to the output drive shaft 16.

Referring now to FIGS. 4-6, a gearing power path or a power transfer system 10 for a land vehicle is schematically illustrated being powered by an electric motor and an engine or prime mover carried on the vehicle. The prime mover, or internal combustion engine, drives the vehicle through a first input drive shaft 12 combined with the electric motor for driving the vehicle through a second input drive shaft 14. The electric motor and prime mover are mechanically interconnected through the gearing power path with the drive wheels for driving the vehicle. The gearing power path or power transfer system 10 includes relatively rotatable sprocket bodies 22, 24 provided with teeth and an endless flexible loop power transferring member 26, by way of example and not limitation such as teeth-engaging elements, whereby a rotatable sprocket body 24 will transfer power from another sprocket body 22 by contact with the endless flexible loop power transferring member 26. The transfer system 10 connects the prime motor and electric motor either individually (FIG. 4—prime mover alone; FIG. 6—electric motor alone) or unitarily (FIG. 5—both prime mover and electric motor) to the same load. The power transfer system 10 includes a rotatable power input sprocket body 22 in driving engagement with the endless flexible loop power transferring member 26 for advancing the endless flexible loop power transferring member 26 along an endless path of travel. A rotatable power output sprocket body 24 engages with the endless flexible loop power transferring member 26 at a position along such endless path to be driven by the endless flexible loop power transferring member 26 and supply power for driving a load.

Each sprocket body 22, 24 structure includes a drive face formed by circumferentially spaced, radially extending teeth intended for driving engagement with radially extending surfaces correspondingly spaced along the length of the endless flexible loop power transferring member 26. The power transfer system 10 includes a clutch 18 for engaging (FIGS. 4-5; position 18a) and disengaging (FIG. 6; position 18b) the first input drive shaft 12 with respect to the output drive shaft 16. The clutch 18 can be used without a gear transmission, or in advance of or behind a gear transmission in a power train. A disconnect mechanism 20 is provided in the power transfer system 10 for engaging (FIG. 5-6; position 20b) and disengaging (FIG. 4; position 20a) the second input drive shaft 14 with respect to the output drive shaft 16. The disconnect mechanism 20 is located between the first sprocket 24 and the corresponding output drive shaft 16 as seen in FIGS. 4-6.

As previously described with respect to FIGS. 1-3, the power transfer system 10 can include the disconnect mechanism 20 located between the second output drive sprocket 22 and the second input drive shaft 14. Alternatively as shown in FIGS. 4-6, the disconnect mechanism 20 can be located between the first output drive sprocket 24 and the output drive shaft 16. The disconnect mechanism 20 can be located along the output drive shaft 16 between the clutch 18 and the first output sprocket 24 as shown in FIGS. 4-6. The first and second input drive shafts 12, 14 can extend parallel to and offset with respect to one another. The first input drive shaft 12 can extend coaxially with respect to the output drive shaft 16. The second input drive shaft 14 can extend parallel to and offset with respect to the output drive shaft 16.

In a first mode of operation, as illustrated in FIGS. 1 and 4, the clutch 18 can be engaged 18a and the disconnect mechanism 20 can be disengaged 20a to allow the power transfer system 10 to transfer power solely from the internal combustion engine or prime mover through the first input drive shaft 12 and the clutch 18 to the output drive shaft 16 to drive the driven wheel load. In a second mode of operation, as illustrated in FIGS. 2 and 5, the clutch 18 can be engaged 18a and the disconnect mechanism 20 can be engaged 20b to allow the power transfer system 10 to transfer power simultaneously from both the internal combustion engine or prime mover through the first input drive shaft 12 and from the electric motor through second input drive shaft 14, sprockets 22, 24 and flexible loop power transferring member 26 to the output drive shaft 16 to drive the driven wheel load. In a third mode of operation, as illustrated in FIGS. 3 and 6, the clutch 18 can be disengaged 18b and the disconnect mechanism 20 can be engaged 20b to allow the power transfer system 10 to transfer power solely from the electric motor through second input drive shaft 14, sprockets 22, 24 and flexible loop power transferring member 26 to the output drive shaft 16 to drive the driven wheel load. In a fourth mode of operation (not illustrated), the clutch 18 can be disengaged 18b and the disconnect mechanism 20 can be disengaged 20a to allow the output drive shaft 16 to rotate without being driven by the internal combustion engine or prime mover through first input drive shaft 12 or by the electric motor through the second input drive shaft 14. In operation, the difference between the configuration of FIGS. 1-3 and FIGS. 4-6 is that in FIGS. 1-3 the sprockets 22, 24 and flexible loop power transferring member 26 rotate in the first, second, third and fourth modes of operation, while in FIGS. 4-6 the sprockets 22, 24 and flexible loop power transferring member 26 only rotates in the second and third modes of operation.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A power transfer system (10) for supporting a first input drive shaft (12) and second input drive shaft (14) to be mechanically interconnected to an output drive shaft (16) for driving driven wheels of a vehicle, comprising:
   a clutch (18) for engaging (18a) and disengaging (18b) the first input drive shaft (12) with respect to the output drive shaft (16);
   a first output drive sprocket (24) connected to the output drive shaft (16);
   a second output drive sprocket (22) connected to the second input drive shaft (14);
   an endless flexible loop power transferring member (26) extending between the first and second sprockets (24, 22); and
   a disconnect mechanism (20) for engaging (20b) and disengaging (20a) the second input drive shaft (14) with respect to the output drive shaft (16), the disconnect mechanism (20) connects and disconnects the first sprocket (24) and the corresponding output drive shaft (16).

2. The power transfer system (10) of claim 1, wherein the disconnect mechanism (20) is located along the output drive shaft (16) between the clutch (18) and the first output sprocket (24).

3. The power transfer system (10) of claim 1 further comprising:
   the first and second input drive shafts (12, 14) extending parallel to and offset with respect to one another.

4. The power transfer system (10) of claim 1 further comprising:
   the first input drive shaft (12) extending coaxially with respect to the output drive shaft (16).

5. The power transfer system (10) of claim 1 further comprising:
   the second input drive shaft (14) extending parallel to and offset with respect to the output drive shaft (16).

6. In a vehicle to be driven by an electric motor and a prime mover carried by the vehicle, the prime mover driving the vehicle through a first input drive shaft (12) and the electric motor driving the vehicle through a second input drive shaft (14), a power transfer system (10) supporting the first and second input drive shafts (12, 14) to be mechanically interconnected to an output drive shaft (16) for driving driven wheels of the vehicle, a clutch (18) for engaging (18a) and disengaging (18b) the first input drive shaft (12) with respect to the output drive shaft (16), a first output drive sprocket (24) connected to the output drive shaft (16), a second output drive sprocket (22) connected to the second input drive shaft (14), and an endless flexible loop power transferring member (26) extending between the first and second sprockets (24, 22), the improvement of the power transfer system (10) comprising:
   a disconnect mechanism (20) for engaging (20b) and disengaging (20a) the second input drive shaft (14) with respect to the output drive shaft (16), the disconnect mechanism (20) connects and disconnects the first sprocket (24) and the corresponding output drive shaft (16).

7. The improvement of the power transfer system (10) of claim 6, wherein the disconnect mechanism (20) is located along the output drive shaft (16) between the clutch (18) and the first output sprocket (24).

8. The improvement of the power transfer system (10) of claim 6 further comprising:
the first and second input drive shafts (12, 14) extending parallel to and offset with respect to one another.

9. The improvement of the power transfer system (10) of claim 6 further comprising:
the first input drive shaft (12) extending coaxially with respect to the output drive shaft (16).

10. The improvement of the power transfer system (10) of claim 6 further comprising:
the second input drive shaft (14) extending parallel to and offset with respect to the output drive shaft (16).

11. In a power transfer system (10) for a land vehicle by an electric motor and an internal combustion engine carried on the vehicle, wherein the internal combustion engine drives the vehicle through a first input drive shaft (12) combined with the electric motor for driving the vehicle through a second input drive shaft (14), wherein the electric motor and internal combustion engine are mechanically interconnected with drive wheels for driving the vehicle including relatively rotatable sprocket bodies (22, 24) provided with teeth and an endless flexible loop power transferring member (26) having teeth-engaging elements, whereby a rotatable sprocket body (24) will transfer power from another sprocket body (22) by contact with the teeth-engaging elements of the endless flexible loop power transferring member (26), wherein the transfer system (10) connects the internal combustion engine and electric motor either individually or unitarily to the same load, wherein the power transfer system (10) includes a rotatable power input sprocket body (22) in driving engagement with the endless flexible loop power transferring member (26) for advancing the endless flexible loop power transferring member (26) along an endless path of travel, and wherein a rotatable power output sprocket body (24) engages with the endless flexible loop power transferring member (26) at a position along such endless path to be driven by the endless flexible loop power transferring member (26) and supply power for driving a load, wherein each sprocket body (22, 24) structure includes a drive face formed by circumferentially spaced, radially extending teeth intended for driving engagement with radially extending teeth-engaging surfaces correspondingly spaced along a length of the endless flexible loop power transferring member (26), the improvement of the power transfer system (10) comprising:
a clutch (18) for engaging (18a) and disengaging (18b) the first input drive shaft (12) with respect to the output drive shaft (16); and
a disconnect mechanism (20) for engaging (20b) and disengaging (20a) the second input drive shaft (14) with respect to the output drive shaft (16), the disconnect mechanism (20) connects and disconnects the rotatable power output sprocket body (24) and the corresponding output drive shaft (16), the first input drive shaft (12) extending coaxially with respect to the output drive shaft (16), the first and second input drive shafts (12, 14) extending parallel to and offset with respect to one another.

* * * * *